(12) United States Patent
Chiu et al.

(10) Patent No.: US 9,746,597 B2
(45) Date of Patent: Aug. 29, 2017

(54) LIGHT PIPE AND HOUSING ASSEMBLY USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Hsien-Huan Chiu, New Taipei (TW); Xiang-Kun Zhong, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 101 days.

(21) Appl. No.: 14/613,498

(22) Filed: Feb. 4, 2015

(65) Prior Publication Data

US 2015/0241615 A1   Aug. 27, 2015

(30) Foreign Application Priority Data

Feb. 25, 2014   (CN) .......................... 2014 1 0063675

(51) Int. Cl.
*F21V 7/04*   (2006.01)
*F21V 8/00*   (2006.01)
(Continued)

(52) U.S. Cl.
CPC ......... *G02B 6/0008* (2013.01); *G02B 6/0006* (2013.01); *G02B 6/3644* (2013.01);
(Continued)

(58) Field of Classification Search
CPC .... G02B 6/0008; G02B 6/0006; G02B 6/002; G02B 6/4214; G02B 6/0045;
(Continued)

(56) References Cited

U.S. PATENT DOCUMENTS 5,506,929 A * 4/1996  Tai ......................... F21S 48/215
                                                      385/146
6,270,244 B1 * 8/2001  Naum .................. G02B 6/0006
                                                      359/238

(Continued)

FOREIGN PATENT DOCUMENTS

CN         1916487 A      2/2007
CN       101566309 A     10/2009
(Continued)

*Primary Examiner* — Peggy Neils
*Assistant Examiner* — William N Harris
(74) *Attorney, Agent, or Firm* — Steven Reiss

(57) ABSTRACT

A light pipe for transmitting lights includes a light incident wall, a light radiation wall, a first side wall, and a second side wall, the light incident wall opposite the light radiation wall, the first side wall opposite the second side wall, the first side wall and the second side wall are connected between the light incident wall and the light radiation wall, respectively. the first side wall and the second side wall are parabolic and having focal points between the first side wall and the second side wall, the first side wall and the second side wall are parabolic making the lights passing through the light radiation wall be uniformly distributed.

8 Claims, 6 Drawing Sheets

(51) Int. Cl.
*G02B 6/42* (2006.01)
*G02B 6/36* (2006.01)

(52) U.S. Cl.
CPC ......... *G02B 6/4219* (2013.01); *G02B 6/4243* (2013.01); *G02B 6/002* (2013.01); *G02B 6/4214* (2013.01)

(58) Field of Classification Search
CPC .. G02B 6/0028; G02B 6/0081; G02B 6/0093; G02B 6/3636; G02B 6/4243; G02B 6/3644; G02B 6/42; G02B 6/4219; G02B 6/12002; G02B 6/12016; G02B 6/4201
USPC .................................................. 362/555, 628
See application file for complete search history.

(56) References Cited

U.S. PATENT DOCUMENTS

| | | | | |
|---|---|---|---|---|
| 7,448,758 | B2* | 11/2008 | Kim | H04N 9/315 348/771 |
| 7,581,862 | B2* | 9/2009 | Stefanov | F21S 48/1241 362/551 |
| 7,611,272 | B2* | 11/2009 | Specht | F21S 48/1154 362/511 |
| 7,980,741 | B2* | 7/2011 | Zwick | F21S 48/2243 362/511 |
| 2006/0024012 | A1* | 2/2006 | Yatsuda | G02B 6/138 385/129 |
| 2006/0104061 | A1* | 5/2006 | Lerner | G02B 17/002 362/249.01 |
| 2007/0145395 | A1* | 6/2007 | Liu | G02B 6/0018 257/98 |
| 2008/0260328 | A1* | 10/2008 | Epstein | G02B 6/0018 385/32 |
| 2009/0201698 | A1* | 8/2009 | Klick | G02B 6/0018 362/555 |
| 2009/0268452 | A1 | 10/2009 | Chang | |
| 2013/0235608 | A1* | 9/2013 | Tsai | G02B 6/0008 362/551 |

FOREIGN PATENT DOCUMENTS

| | | |
|---|---|---|
| CN | 201437961 U | 4/2010 |
| CN | 202835196 U | 3/2013 |
| TW | 200720705 A | 6/2007 |
| TW | M336451 U | 7/2008 |

* cited by examiner

LIGHT PIPE AND HOUSING ASSEMBLY USING THE SAME

FIELD

The present disclosure relates to light transmission devices, and more particularly to a light pipe for transmitting light from a plurality of light sources.

BACKGROUND

A light pipe is assembled to a device housing to transmit light emitted by a light source to the exterior of the product for the purposes of indicating device status, or other important information, to a user.

BRIEF DESCRIPTION OF THE DRAWINGS

Implementations of the present technology will now be described, by way of example only, with reference to the attached figures, wherein.

DETAILED DESCRIPTION

Figure 1:
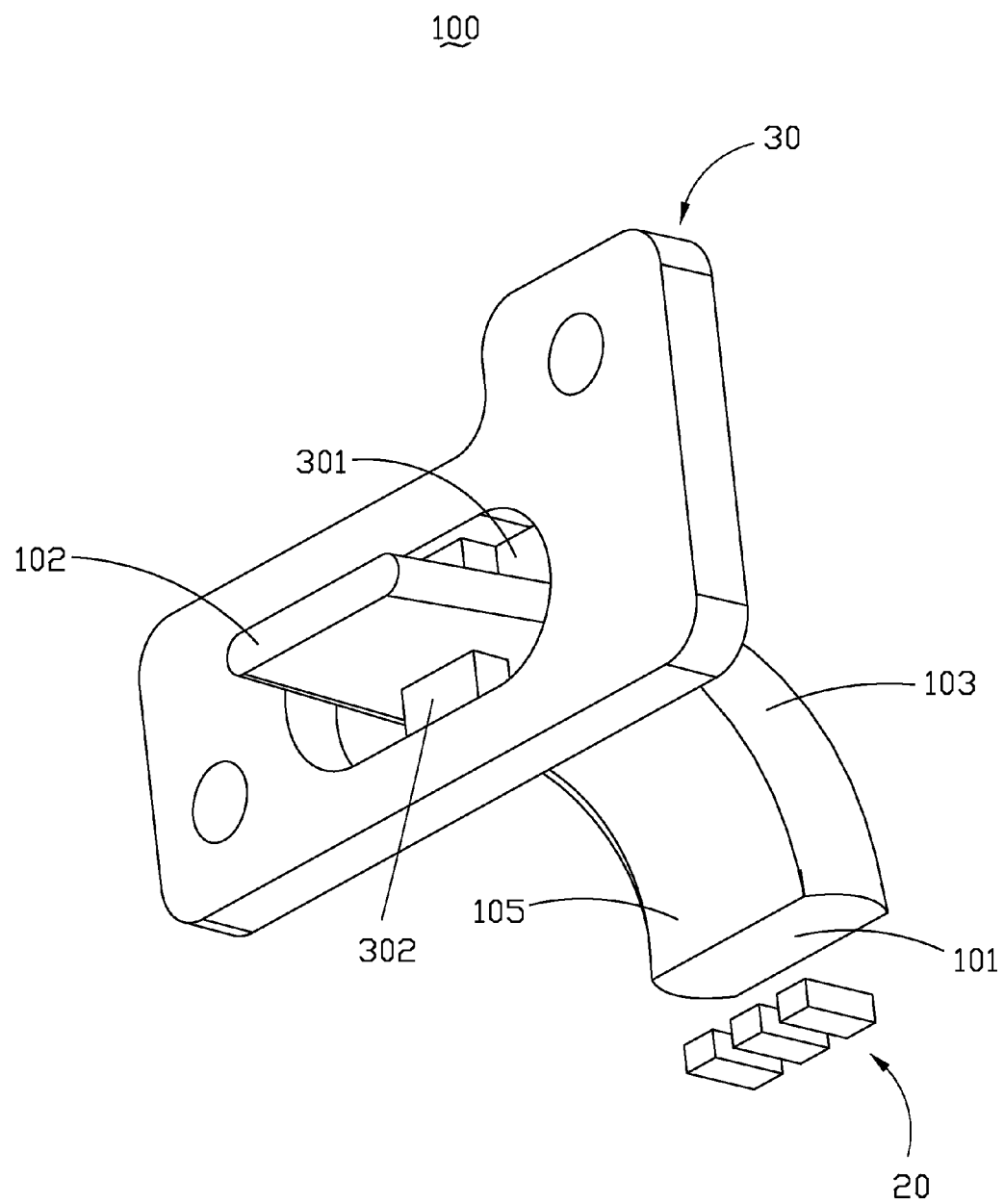
FIG. 1 is an isometric view of a housing assembly with a light pipe in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The present disclosure is described in relation to a light pipe for a plurality of light sources.

FIG. 1 illustrates that a housing assembly 100 includes a housing (not shown), a light pipe 10, a fixing plate 30 fixing the light pipe 10, and a plurality of light sources 20. In this embodiment, the fixing plate 30 is a component detachably mounted to the housing allowing the light pipe 10 to be detachably mounted to the housing. In other embodiments, the fixing plate 30 may be a part of the housing. The light pipe 10 transmits the lights emitted by the plurality of light sources 20 to the exterior of the housing assembly 100. In this embodiment, the housing may be a housing of a mobile phone, a computer, a television and so on; the light pipe 10 is made with moldable light guiding material.

The fixing plate 30 is a L shaped board, and defines a hole 301. A pair of clamping blocks 302 protrudes from a side wall of the fixing plate 30 surrounding the hole 301. The light pipe 10 is passed through the hole 301 and clamped by the clamping blocks 302.

Figure 2:
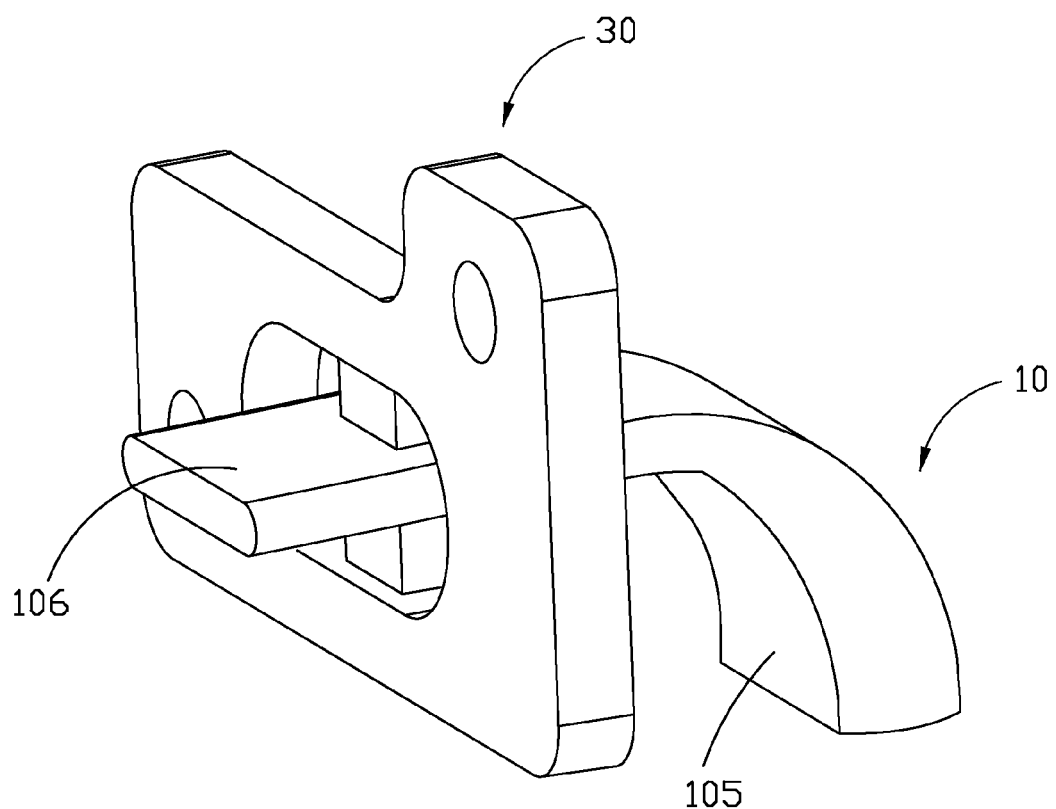
FIG. 2 is an isometric view of a light pipe in FIG. 1.
Figure 3:
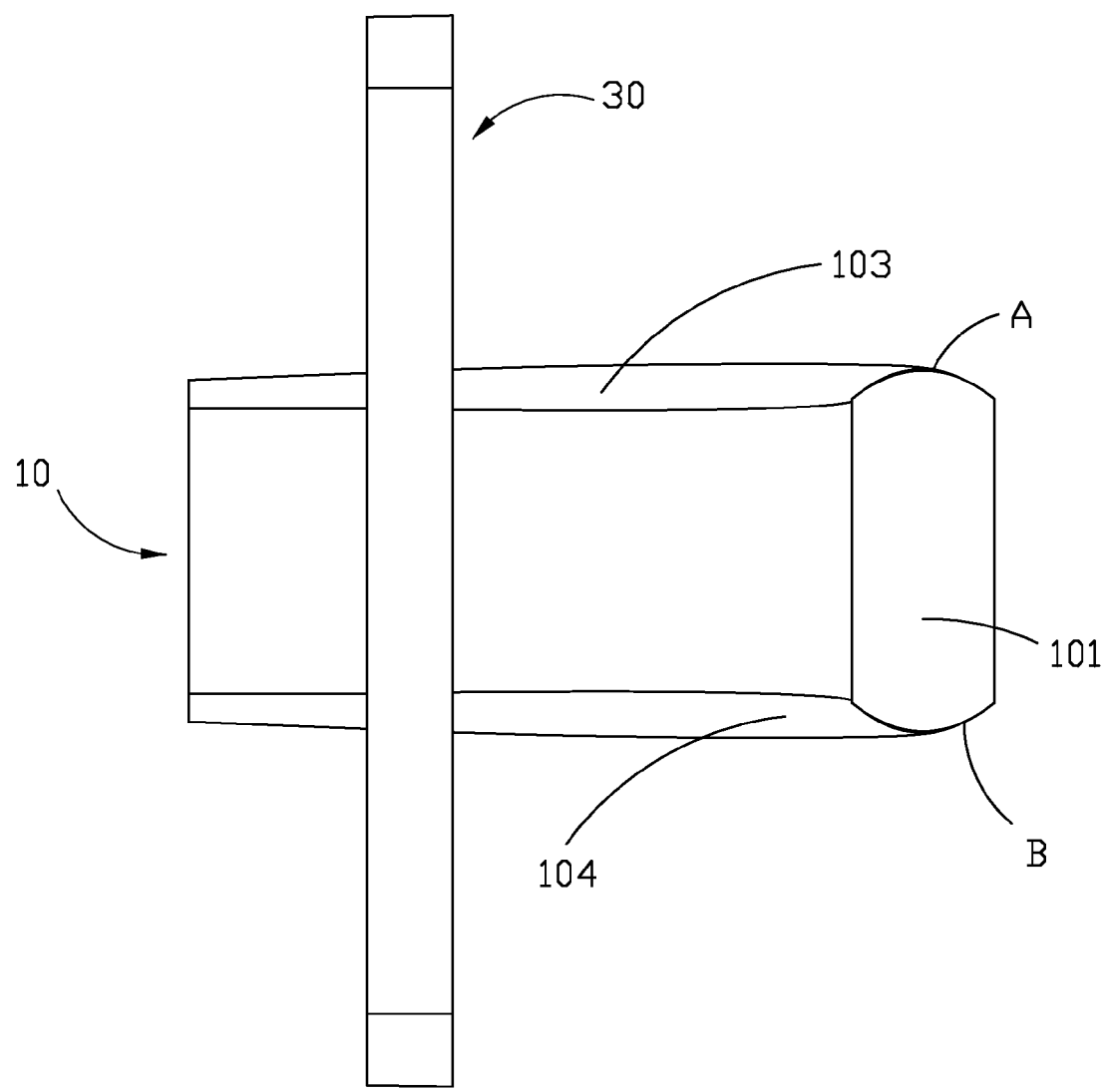
FIG. 3 is a bottom view of FIG. 2.
Figure 4:
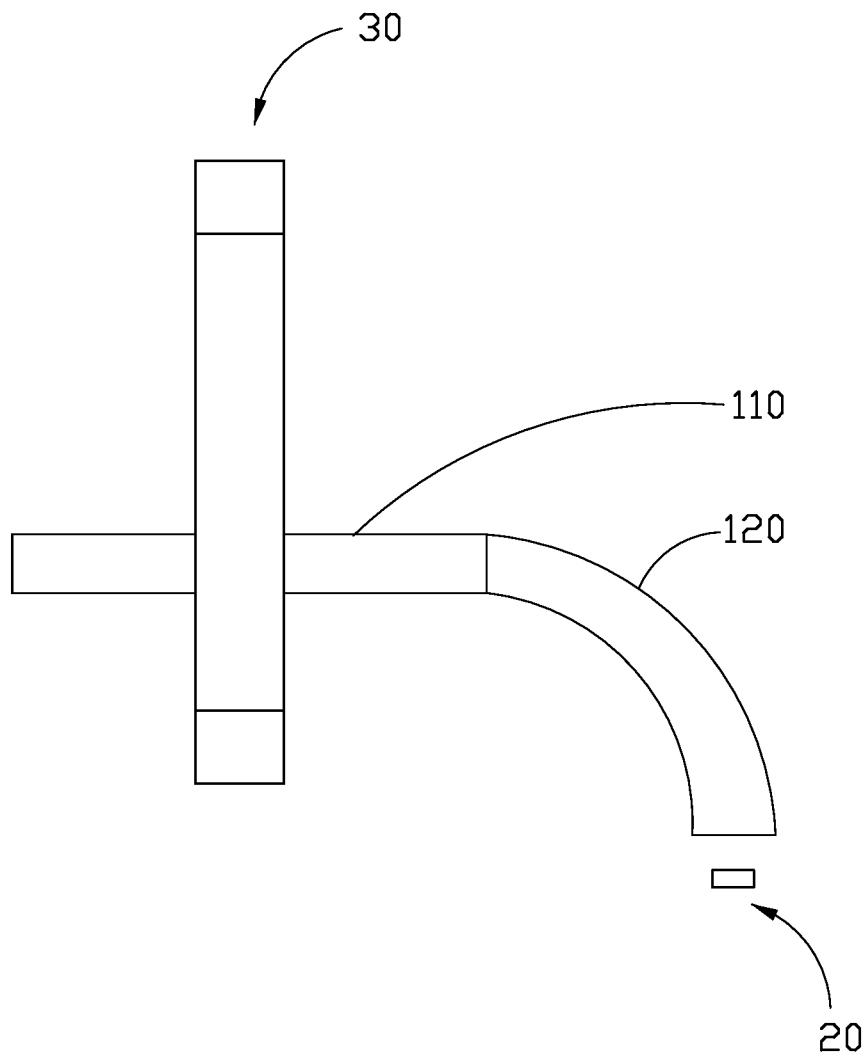
FIG. 4 is a side view of FIG. 2.

FIG. 2 is an isometric view of a light pipe in FIG. 1. FIG. 3 is a bottom view of FIG. 2. FIG. 4 is a side view of FIG. 2. The light pipe 10 is substantially an arc shaped. The light pipe 10 is formed by a first part 110, and a second part 120 extending from an end of the first part 110. A cross-section of the first part 110 is a rectangle, and a cross-section of the second part 120 is a one-fourth arc extending from an end of the first part 110. The light pipe 10 includes a light incident wall 101 formed at an end of the second part 120 away from the first part 110, a light radiation wall 102 formed at an end of the first part 110 away from the second part 120 and opposite the light incident wall 101, a first side wall 103 connected between the light incident wall 101 and the light radiation wall 102, a second side wall 104 is opposite to the first sidewall 103 and connected between the light incident wall 101 and the light radiation wall 102, a third side wall 105 is connected among light incident wall 101, the light radiation wall 102, the first side wall 103 and the second side wall 104, and a fourth side wall 106 opposite the third side wall 105 and connected among light incident wall 101, the light radiation wall 102, the first side wall 103, the second side wall 104 and the third side wall 105. The light incident wall 101 and the light radiation wall 102 are vertical to the first side wall 105, the second side wall 106, the third side wall 103, and the fourth side wall 104. In this embodiment, the first side wall 103 and the second side wall 104 are two parabolic walls. In other embodiments, the first side wall 103 and the second side wall 104 can be other shapes and respectively include a parabolic surface facing each other.

Figure 5:
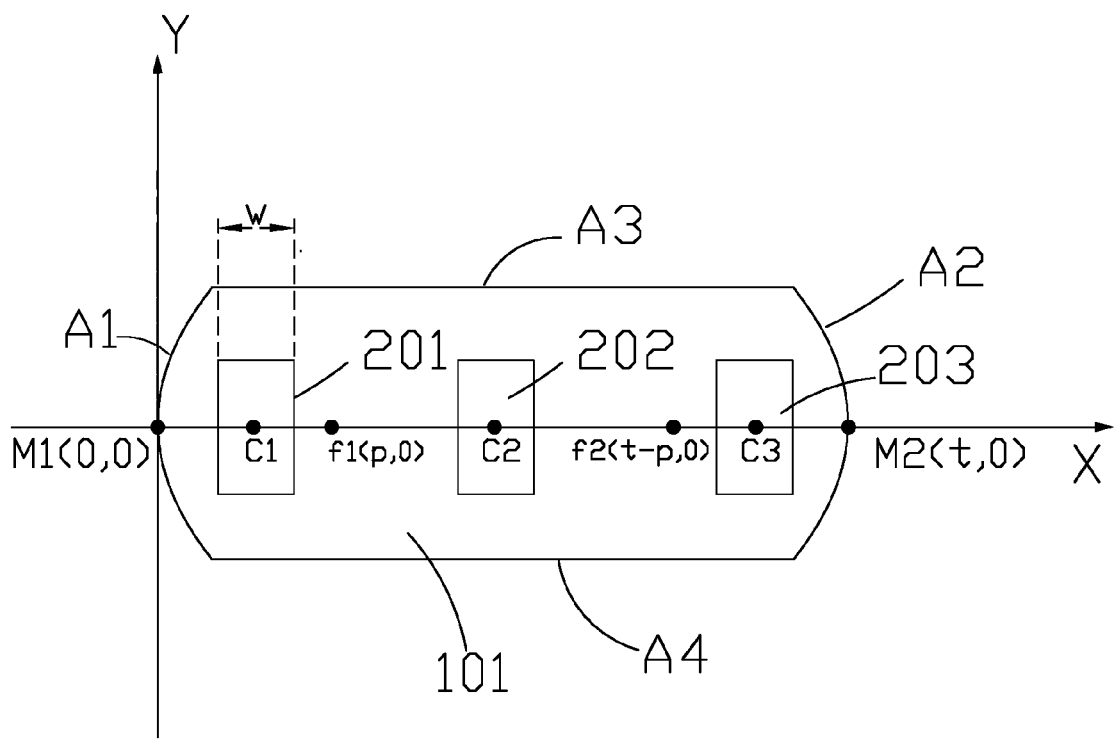
FIG. 5 illustrates a diagrammatic view of a light source on a light incident wall.

FIG. 5 illustrates that the light incident wall 101 includes a first edge line A1, connected to the first side wall 103, a second edge line A2 connected to the second side wall 104, a third edge line A3 connected to the third side wall 105, and a forth edge line A4 connected to fourth side wall 106. The first edge line A1 and the second edge line A2 are parabolas. The light incident wall 101 are on a two-dimension plane X-Y, the first edge line A1 and the second edge line A2 are symmetrical with each other with respect to a line (not shown) parallel to a first axis Y of the plane X-Y. Each of the first edge line A1 and the second edge line A2 is symmetrical in respect to a second axis X of the plane X-Y perpendicular to the first Y axis. The third edge line A3 and the fourth edge line A4 are two straight lines, and asymmetrical with each other with respect to the second axis X. A first middle point of the first edge line A1 which is a vertex of the corresponding parabola is located at an original point M1 of the plane X-Y, which is an intersection point of the second axis X and first axis Y. The second middle point of the second edge line A2 which is a vertex of the corresponding parabola is located at a point M2 which is an intersection point of the second axis X and the second edge line A2, and a coordinate of the point M2 is (t,0). The focal length of the first edge line A1 (or the second edge line A2) is P. The focal point f1 of the first edge line A2 and the focal point f2 of the second edge line A2 are located between the first edge line A1 and the second edge line A2. Accordingly, a coordinate of a focal point f1 of the edge line A1 corresponding to the first edge line A is (p, 0), and a coordinate of a focal point f2 of the edge line A2 is (t-p, 0). In other embodiments, the focal length of the first edge line A1 is not equal to the focal length of the second edge line A2.

The plurality of light sources 20 faces the light incident wall 101. In the embodiment, the light sources 20 are three LEDs. The lights emitted by the light sources 20 pass through the light incident wall 101 into the light pipe 10, are then reflected in the light pipe 10, and are finally transmitted to air from the light radiation wall 102. Projections 201-203 of the three LEDs with respect to the plane X-Y are located in the light incident wall 101. The regions 201-203 are rectangular. Each of the widths of the regions 201-203 is W. The focal point f1 and focal point f2 are not located in the regions 201-203. The centers C1-C3 of the regions 201-203 are located on the second axis X.

When the light is reflected, a luminance distribution of the light is similar to a Gaussian distribution that the luminance distribution of the light is gradually weakened from a center to edge. However, when the light is reflected by a parabolic surface, the luminance distribution of the light can be more uniform.

Figure 6:
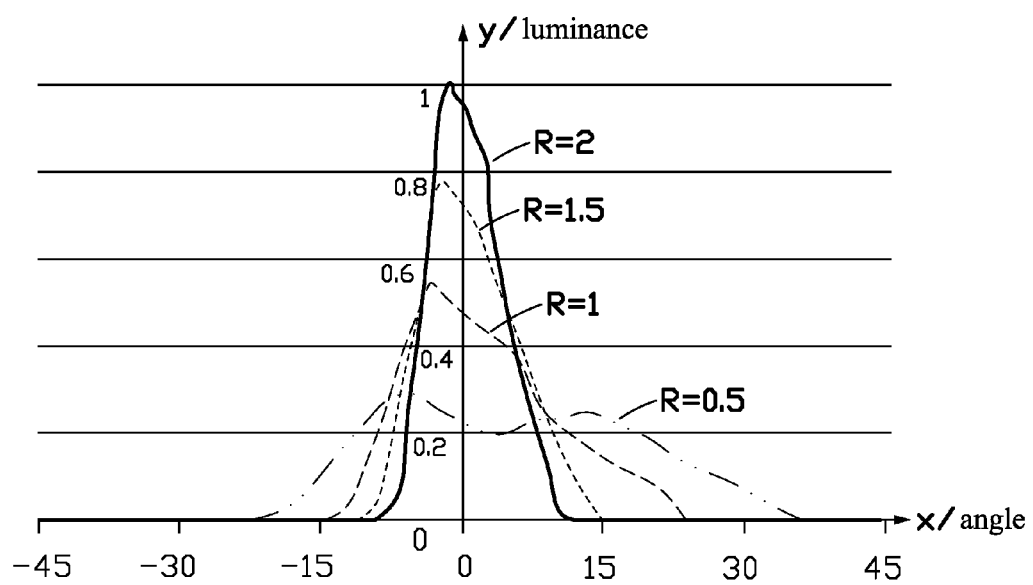
FIG. 6 illustrates a luminance distribution of the light on a light radiation wall.

FIG. 6 shows a luminance distribution of the light source 20 on the light radiation wall 102 when a ratio of the width W of the region 201 (or region 202, region 203), and the focal length P of the first edge line A1 (or the second edge line A2) is changed. In detail, in FIG. 6, R indicates a ratio of P and W. The light passing through from the radiation wall 102 is different from the Gaussian distribution but more uniformly distributed. To sum up, the R becomes smaller; the lights passing through from the radiation wall 102 will be more uniformly distributed.

In present disclosure, the first side wall 103 and the second side wall 104 are parabolic allowing the lights passing through the light radiation wall 102 to be uniformly distributed.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A housing assembly, the housing assembly comprising:
    a fixing plate;
    a light pipe mounted to the fixing plate, the light pipe configured to transmit lights, the light pipe comprising:
    a light incident wall;
    a light radiation wall opposite to the light incident wall;
    a first side wall having a first parabolic surface, the first side wall connected to the light incident wall and the light radiation wall; and
    a second side wall having a second parabolic surface, the second side wall opposite to the first side wall and connected to the light incident wall and the light radiation wall,
    wherein the first and the second parabolic surfaces each having respective a focal point located between the first and the second parabolic surfaces; wherein the two focal points are on the light incident wall;
    wherein the fixing plate defines a hole, a pair of clamping blocks protrudes from the fixing plate surrounding the hole, the light pipe passes through the hole and is clamped by the pair of clamping blocks, and the light pipe is stretched out from the hole.

2. The housing assembly of claim 1, further comprising a plurality of light sources, the light sources emit light.

3. The housing assembly of claim 2, wherein the light sources face to the light incident wall.

4. The housing assembly of claim 1, wherein cross-sections of the first parabolic surface and the second parabolic surface form a first parabola and a second parabola, focal lengths of the first parabola and the second parabola are P, and widths of projections of light sources on the light incident wall are W, a ratio of P and W is R, and when R becomes smaller, the lights passing through the light radiation wall becomes more uniformly distributed.

5. The housing assembly of claim 4, wherein the R is less than 2 and larger than 0.

6. The housing assembly of claim 1, wherein the first parabolic surface and the second parabolic surface are axially symmetrical with each other.

7. The light pipe of claim 4, wherein focal lengths of the first parabolic surface and the second parabolic surface are identical.

8. The light pipe of claim 1, wherein the first side wall has a first parabolic surface, the second side wall has a second parabolic surface, the first parabolic surface and the second parabolic surface comprises a plurality of arcs parallel to the light incident wall, and cross-sections of the light pipe parallel to the light incident wall comprises two arcs and two straight lines.

* * * * *